March 29, 1960   A. STOREY ET AL   2,930,641
PISTON ENGINES, PUMPS OR THE LIKE
Filed Sept. 10, 1956
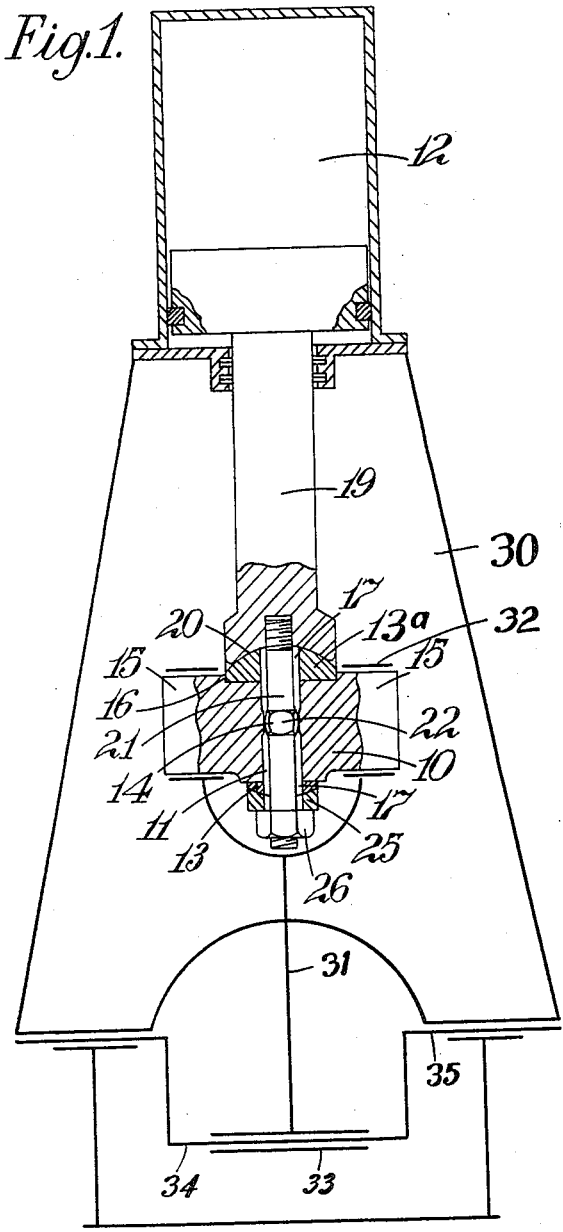
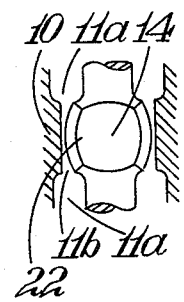
Inventors
Arthur Storey &
James Albert Hardy

United States Patent Office 2,930,641
Patented Mar. 29, 1960

2,930,641

PISTON ENGINES, PUMPS OR THE LIKE

Arthur Storey and James Albert Hardy, Sunderland, England, assignors to William Doxford & Sons (Engineers) Limited, Sunderland, England, a British company Application September 10, 1956, Serial No. 608,803

5 Claims. (Cl. 287—87)

The invention relates to piston engines, pumps, compressors or the like, of the kind which has a piston rod attached at one end to a piston, and at the other end to a crosshead which is guided for rectilinear movement and in which the connection of the rod to the crosshead includes an extension of the rod which passes, with side clearance, through a throughway in the crosshead and two spaced concentric spherical bearing surfaces on the rod and/or on the extension thereof bearing on mating surfaces on the crosshead at each end of the throughway respectively, whereby a limited amount of universal pivoting movement between the rod and the crosshead is permitted.

In the known engines of this kind the common centre of the bearing surfaces is at a position beyond the end of the extension (i.e. at one side of both of the bearing surfaces).

The lateral movement of the piston rod during pivoting is limited by the clearance of the extension in the passageway, and in the known construction, this imposes a severe restriction on the angular movement especially in view of the position of the centre of the spherical surfaces beyond the end of the extension. It is an object of the present invention to provide an improved construction in which greater angular movement is made possible without increase in the side clearance.

According to the invention, in an engine, pump or the like of the above kind, the common centre of curvature of the spherical surfaces is located between the spaced surfaces.

Preferably, the centre is at, or closely adjacent to, the mid-point in the length of the throughway.

When, as is usual, there is a connecting rod pivotally attached to the cross-head, it is preferred that the centre is on, or closely adjacent to, the pivotal axis of the connecting rod.

In one construction according to the invention, the piston rod extension is of non-circular (e.g. polygonal) cross-section at, at least, one position along its length and the throughway has a shape which co-operates therewith to prevent or restrict rotation of the rod about its longitudinal axis. The non-circular portion is, preferably, at or adjacent to the centre aforesaid. The portion may have four sides and be curved in the axial and circumferential directions to permit the universal pivotal movement of the rod. The throughway may be of square section without curvature.

One specific construction according to the invention will now be described by way of example and with reference to the accompanying diagrammatic drawings in which:

Figure 1 represents diagrammatically a section through a diesel engine, the relevant parts being shown to an exaggerated scale; and Figure 2 is an enlarged sectional view of a portion of the piston rod extension and crosshead.

The construction according to this example is applied to a diesel engine cylinder having only one piston but it may equally well be applied to the centre crosshead of a diesel engine of the opposed piston type having three cranks per cylinder.

The crosshead 10 has a central throughway 11 which is co-axial with the cylinder 12. The throughway is round in section at each end 11a whereas the middle portion 11b is of square section over a short length. Bearing on the top and bottom faces of the crosshead there are pads 13a, 13, which are formed respectively with upwardly and downwardly facing convex spherical bearing surfaces, the surfaces both being curved about a centre 14 at the middle of the throughway and lying on the axis of the connecting rod journals 15. The upper pad, 13a, is received partly within a recess 16 in the crosshead which locates the pad. The pads have central holes 17 which constitute the end portions of the throughway.

The lower end of the piston rod 19 has a concave part-spherical recess 20 which mates with the upper pad 13a. Screwed into the end of the rod there is a stud 21 which is co-axial with the rod and constitutes the extension aforesaid. This stud extends through the throughway 11, 17, and, except at the middle of its length, has substantial side clearance therein. At the middle the rod has an enlargement 22 which, in section, has four convexly-curved sides. The sides are also convexly curved lengthwise of the rod. This enlargement is received within the square portion 11b of the throughway and mates therewith to prevent rotation of the rod in the crosshead while permitting pivotal movement.

On the underside of the crosshead there is a pad 25 which is threaded over the stud 21 and has a concave spherical surface mating with the lower pad 13, on the crosshead. A nut 26 screwed on to the end of the stud holds the assembly together while permitting relative movement of the spherical bearing members. Accordingly the piston rod has freedom of rocking movement which is limited only by contact of the stud with the sides of the throughway. The pivotal movement is about the centre of the spherical curvature and by reason of the position of this centre may be substantially greater than in the known constructions.

The extension may be constructed as an integral part of the piston rod instead of as a separate stud, if desired.

The crosshead has sliding bearing faces, not shown, which slide on guide surfaces on the engine frame members 30. The engine has a connecting rod which is shown diagrammatically at 31 and has at one end bearing 32 embracing the journals 15 and at the other end a bearing 33 embracing the crankpin 34 of a crankshaft 35.

We claim:

1. In a piston engine, pump, compressor or the like piston machine having a piston, a piston rod attached at one end to the piston, a crosshead and guide means for constraining the crosshead to move in a rectilinear path parallel to the axis of the piston rod; attachment means by which the crosshead is secured to the other end of the piston rod comprising an extension of the rod which passes, with side clearance, through a throughway in the crosshead, two spaced concentric concave axially facing spherical bearing surfaces one on the rod and one on its extension at opposite ends of the throughway and two convex spherical bearing surfaces on the crosshead at opposite ends of the throughway mating respectively with the two surfaces on the rod and the extension, all the surfaces having a common center of curvature located within the length of the throughway, and in which the extension of the piston rod is of non-circular cross-section at, at least, one position along its length and the throughway at a corresponding position has a non-circular shape which cooperates with the non-circular part of the piston rod extension to restrict rotation of the piston rod about the longitudinal axis.

2. A machine as claim in claim 1 in which the non-circular portion of the piston rod embraces within its length the aforesaid center.

3. A machine as claimed in claim 1 in which the non-circular portion of the rod is of polygonal section.

4. A machine as claimed in claim 1 in which the non-circular portion of the rod has four sides which are curved in both the axial and the circumferential directions.

5. A machine as claimed in claim 4 in which the throughway is of square section at the position aforesaid.

References Cited in the file of this patent

UNITED STATES PATENTS

| | | |
|---|---|---|
| 784,680 | Huyck | Mar. 14, 1905 |
| 1,373,337 | Kronenberg | Mar. 29, 1921 |
| 1,801,517 | Matthews | Apr. 21, 1931 |
| 1,979,557 | Keller | Nov. 6, 1934 |
| 2,439,195 | Witmeyer et al. | Apr. 6, 1948 |
| 2,644,731 | Doeg | July 7, 1953 |